(12) United States Patent
Jain et al.

(10) Patent No.: US 7,277,990 B2
(45) Date of Patent: Oct. 2, 2007

(54) METHOD AND APPARATUS PROVIDING EFFICIENT QUEUE DESCRIPTOR MEMORY ACCESS

(76) Inventors: Sanjeev Jain, 3 Mallard Cir., Shresbury, MA (US) 01545; Gilbert M. Wolrich, 4 Cider Mill Rd., Framingham, MA (US) 01710

( * ) Notice: Subject to any disclaimer, the term of this patent is extended or adjusted under 35 U.S.C. 154(b) by 349 days.

(21) Appl. No.: 10/955,969

(22) Filed: Sep. 30, 2004

(65) Prior Publication Data

US 2006/0069854 A1    Mar. 30, 2006

(51) Int. Cl.
G06F 12/00    (2006.01)

(52) U.S. Cl. ........................... 711/133; 370/412

(58) Field of Classification Search ............... 711/133
See application file for complete search history.

(56) References Cited

U.S. PATENT DOCUMENTS

| | | | |
|---|---|---|---|
| 5,257,218 A | 10/1993 | Poon | |
| 5,398,244 A | 3/1995 | Mathews et al. | |
| 5,442,576 A | 8/1995 | Gergen et al. | |
| 5,455,599 A | 10/1995 | Cabral et al. | |
| 5,460,349 A | 10/1995 | Campbell et al. | |
| 5,477,383 A | 12/1995 | Jain | |
| 5,974,525 A | 10/1999 | Lin et al. | |
| 6,145,054 A * | 11/2000 | Mehrotra et al. | 711/119 |
| 6,226,713 B1 * | 5/2001 | Mehrotra | 711/118 |
| 6,247,116 B1 | 6/2001 | Abdallah et al. | |
| 6,263,426 B1 | 7/2001 | Abdallah et al. | |
| 6,266,769 B1 | 7/2001 | Abdallah et al. | |
| 6,282,554 B1 | 8/2001 | Abdallah et al. | |
| 6,292,815 B1 | 9/2001 | Abdallah et al. | |
| 6,307,789 B1 | 10/2001 | Wolrich et al. | |
| 6,324,624 B1 | 11/2001 | Wolrich et al. | |
| 6,427,196 B1 | 7/2002 | Adiletta et al. | |
| 6,442,697 B1 | 8/2002 | Jain et al. | |
| 6,463,072 B1 | 10/2002 | Wolrich et al. | |
| 6,469,925 B1 | 10/2002 | Jain | |
| 6,480,868 B2 | 11/2002 | Abdallah et al. | |
| 6,502,115 B2 | 12/2002 | Thakkar et al. | |
| 6,510,075 B2 | 1/2003 | Jain | |
| 6,532,509 B1 | 3/2003 | Wolrich et al. | |
| 6,549,451 B2 | 4/2003 | Jain | |
| 6,560,667 B1 | 5/2003 | Wolrich et al. | |
| 6,571,333 B1 | 5/2003 | Jain et al. | |
| 6,574,738 B2 | 6/2003 | Jain et al. | |
| 6,577,542 B2 | 6/2003 | Wolrich et al. | |
| 6,584,522 B1 | 6/2003 | Wolrich et al. | |
| 6,587,906 B2 | 7/2003 | Wolrich et al. | |

(Continued)

OTHER PUBLICATIONS

"Intel IXP1200 Network Processor Family—The Foundation of a Total Development Environment for Next-Generation Networks", *Prodcut Brief*, (2001),1-4.

(Continued)

*Primary Examiner*—Brian R. Peugh
*Assistant Examiner*—Hashem Farrokh
(74) *Attorney, Agent, or Firm*—Daly, Crowley, Mofford & Durkee, LLP

(57) ABSTRACT

A system having queue control structures includes a conflict avoidance mechanism to prevent memory bank conflicts for queue descriptor access. In one embodiment, a queue descriptor bank table contains information including in which memory bank each queue descriptor is stored.

16 Claims, 8 Drawing Sheets

U.S. PATENT DOCUMENTS

| | | |
|---|---|---|
| 6,606,704 B1 | 8/2003 | Adiletta et al. |
| 6,625,654 B1 | 9/2003 | Wolrich et al. |
| 6,631,430 B1 | 10/2003 | Wolrich et al. |
| 6,631,462 B1 | 10/2003 | Wolrich et al. |
| 6,633,987 B2 | 10/2003 | Jain et al. |
| 6,661,794 B1 | 12/2003 | Wolrich et al. |
| 6,667,920 B2 | 12/2003 | Wolrich et al. |
| 6,668,311 B2 | 12/2003 | Hooper et al. |
| 6,681,300 B2 | 1/2004 | Wolrich et al. |
| 6,687,246 B1 | 2/2004 | Wolrich et al. |
| 6,694,380 B1 | 2/2004 | Wolrich et al. |
| 6,694,397 B2 | 2/2004 | Lackey, et al. |
| 6,728,845 B2 | 4/2004 | Adiletta et al. |
| 6,738,068 B2 | 5/2004 | Cohen et al. |
| 6,738,831 B2 | 5/2004 | Wolrich et al. |
| 6,779,084 B2 | 8/2004 | Wolrich et al. |
| 6,782,472 B2 | 8/2004 | Jain et al. |
| 6,792,488 B2 | 9/2004 | Wolrich et al. |
| 6,819,201 B2 | 11/2004 | Jain |
| 6,823,438 B2 | 11/2004 | Hooper et al. |
| 6,829,056 B1 | 12/2004 | Barnes et al. |
| 7,024,521 B2 * | 4/2006 | Glasco ............... 711/145 |
| 2001/0051948 A1 | 12/2001 | Srinivisan et al. |
| 2002/0006050 A1 | 1/2002 | Jain |
| 2002/0013861 A1 | 1/2002 | Adiletta et al. |
| 2002/0038403 A1 | 3/2002 | Wolrich et al. |
| 2002/0041520 A1 | 4/2002 | Wolrich et al. |
| 2002/0042150 A1 | 4/2002 | Prestegard et al. |
| 2002/0049603 A1 | 4/2002 | Mehra et al. |
| 2002/0049749 A1 | 4/2002 | Helgeson et al. |
| 2002/0053016 A1 | 5/2002 | Wolrich et al. |
| 2002/0053017 A1 | 5/2002 | Adiletta et al. |
| 2002/0055852 A1 | 5/2002 | Little et al. |
| 2002/0059559 A1 | 5/2002 | Reddy et al. |
| 2002/0069121 A1 | 6/2002 | Jain et al. |
| 2002/0073091 A1 | 6/2002 | Jain et al. |
| 2002/0081714 A1 | 6/2002 | Jain et al. |
| 2002/0085008 A1 | 7/2002 | Jain et al. |
| 2002/0087862 A1 | 7/2002 | Jain et al. |
| 2002/0091710 A1 | 7/2002 | Dunham et al. |
| 2002/0106085 A1 | 8/2002 | Jain et al. |
| 2002/0107811 A1 | 8/2002 | Jain et al. |
| 2002/0111731 A1 | 8/2002 | Jain et al. |
| 2002/0123749 A1 | 9/2002 | Jain |
| 2002/0126621 A1 | 9/2002 | Johnson et al. |
| 2002/0143665 A1 | 10/2002 | Santos et al. |
| 2002/0144039 A1 | 10/2002 | Lackey et al. |
| 2002/0154610 A1 | 10/2002 | Tiedemann et al. |
| 2002/0161889 A1 | 10/2002 | Gamache et al. |
| 2002/0167834 A1 | 11/2002 | Jain |
| 2002/0167835 A1 | 11/2002 | Jain |
| 2002/0167836 A1 | 11/2002 | Jain |
| 2002/0167837 A1 | 11/2002 | Jain |
| 2002/0167845 A1 | 11/2002 | Jain |
| 2002/0169445 A1 | 11/2002 | Jain et al. |
| 2002/0172210 A1 | 11/2002 | Wolrich et al. |
| 2002/0176290 A1 | 11/2002 | Jain |
| 2002/0178229 A1 | 11/2002 | Sinha et al. |
| 2002/0184352 A1 | 12/2002 | Jain et al. |
| 2002/0186657 A1 | 12/2002 | Jain et al. |
| 2002/0188884 A1 | 12/2002 | Jain et al. |
| 2002/0193118 A1 | 12/2002 | Jain et al. |
| 2002/0194560 A1 | 12/2002 | Jain et al. |
| 2003/0004669 A1 | 1/2003 | Gupta et al. |
| 2003/0004688 A1 | 1/2003 | Gupta et al. |
| 2003/0004720 A1 | 1/2003 | Garudari et al. |
| 2003/0009699 A1 | 1/2003 | Gupta et al. |
| 2003/0014662 A1 | 1/2003 | Gupta et al. |
| 2003/0018677 A1 | 1/2003 | Mathur et al. |
| 2003/0028578 A1 | 2/2003 | Jain et al. |
| 2003/0041082 A1 | 2/2003 | Dibrino |
| 2003/0041099 A1 | 2/2003 | Kishore et al. |
| 2003/0041216 A1 | 2/2003 | Rosenbluth et al. |
| 2003/0041228 A1 | 2/2003 | Rosenbluth et al. |
| 2003/0046044 A1 | 3/2003 | Jain et al. |
| 2003/0046488 A1 | 3/2003 | Rosenbluth et al. |
| 2003/0051073 A1 | 3/2003 | Mishra et al. |
| 2003/0055829 A1 | 3/2003 | Kambo et al. |
| 2003/0056055 A1 | 3/2003 | Hooper et al. |
| 2003/0063517 A1 | 4/2003 | Jain |
| 2003/0065366 A1 | 4/2003 | Merritt et al. |
| 2003/0065785 A1 | 4/2003 | Jain |
| 2003/0079040 A1 | 4/2003 | Jain et al. |
| 2003/0081582 A1 | 5/2003 | Jain et al. |
| 2003/0101361 A1 | 5/2003 | Jain et al |
| 2003/0101438 A1 | 5/2003 | Mishra et al. |
| 2003/0105899 A1 | 6/2003 | Rosenbluth et al. |
| 2003/0105901 A1 | 6/2003 | Wolrich et al. |
| 2003/0110166 A1 | 6/2003 | Wolrich et al. |
| 2003/0110322 A1 | 6/2003 | Wolrich et al. |
| 2003/0110458 A1 | 6/2003 | Jain et al. |
| 2003/0115347 A1 * | 6/2003 | Wolrich et al. ............. 709/230 |
| 2003/0115426 A1 | 6/2003 | Rosenbluth et al. |
| 2003/0120473 A1 | 6/2003 | Jain et al. |
| 2003/0131022 A1 | 7/2003 | Wolrich et al. |
| 2003/0131198 A1 | 7/2003 | Wolrich et al. |
| 2003/0135351 A1 | 7/2003 | Wilkinson et al. |
| 2003/0140196 A1 | 7/2003 | Wolrich et al. |
| 2003/0144858 A1 | 7/2003 | Jain et al. |
| 2003/0145155 A1 | 7/2003 | Wolrich et al. |
| 2003/0145159 A1 | 7/2003 | Adiletta et al. |
| 2003/0145173 A1 | 7/2003 | Wilkinson et al. |
| 2003/0147409 A1 | 8/2003 | Wolrich et al. |
| 2003/0150998 A1 | 8/2003 | Shin et al. |
| 2003/0172313 A1 | 9/2003 | Jain et al. |
| 2003/0191866 A1 | 10/2003 | Wolrich et al. |
| 2003/0191988 A1 | 10/2003 | Dalal et al. |
| 2003/0193936 A1 | 10/2003 | Wolrich et al. |
| 2003/0196012 A1 | 10/2003 | Wolrich et al. |
| 2003/0204394 A1 | 10/2003 | Garudadri et al. |
| 2003/0204665 A1 | 10/2003 | Jain et al. |
| 2003/0210574 A1 | 11/2003 | Wolrich et al. |
| 2003/0212619 A1 | 11/2003 | Jain et al. |
| 2003/0212852 A1 | 11/2003 | Wolrich et al. |
| 2003/0219984 A1 | 11/2003 | Ying et al. |
| 2003/0224811 A1 | 12/2003 | Jain et al. |
| 2003/0233494 A1 | 12/2003 | Ghosh et al. |
| 2003/0235189 A1 | 12/2003 | Mathew et al. |
| 2004/0004972 A1 | 1/2004 | Lakshmanamurthy et al. |
| 2004/0010791 A1 | 1/2004 | Jain et al. |
| 2004/0012459 A1 | 1/2004 | Jain |
| 2004/0032414 A1 | 2/2004 | Jain et al. |
| 2004/0034743 A1 | 2/2004 | Wolrich et al. |
| 2004/0039424 A1 | 2/2004 | Merritt et al. |
| 2004/0039895 A1 | 2/2004 | Wolrich et al. |
| 2004/0054880 A1 | 3/2004 | Bernstein et al. |
| 2004/0068614 A1 | 4/2004 | Rosenbluth et al. |
| 2004/0071152 A1 | 4/2004 | Wolrich et al. |
| 2004/0072563 A1 | 4/2004 | Holcman et al. |
| 2004/0073728 A1 | 4/2004 | Wolrich et al. |
| 2004/0073778 A1 | 4/2004 | Adiletta et al. |
| 2004/0073893 A1 | 4/2004 | Rajaram et al. |
| 2004/0078643 A1 | 4/2004 | Ghosh et al. |
| 2004/0081229 A1 | 4/2004 | Narayan et al. |
| 2004/0085901 A1 | 5/2004 | Hooper et al. |
| 2004/0093261 A1 | 5/2004 | Jain et al. |
| 2004/0093571 A1 | 5/2004 | Jain et al. |
| 2004/0098433 A1 | 5/2004 | Narayan et al. |
| 2004/0098496 A1 | 5/2004 | Wolrich et al. |
| 2004/0109369 A1 | 6/2004 | Wolrich et al. |
| 2004/0117239 A1 | 6/2004 | Mittal et al. |
| 2004/0117791 A1 | 6/2004 | Prasad et al. |
| 2004/0120359 A1 | 6/2004 | Frenzel et al. |
| 2004/0136445 A1 | 7/2004 | Olson et al. |

| | | |
|---|---|---|
| 2004/0139290 A1 | 7/2004 | Wolrich et al. |
| 2004/0160290 A1 | 8/2004 | Jain et al. |
| 2004/0162083 A1 | 8/2004 | Chen et al. |
| 2004/0162933 A1 | 8/2004 | Adiletta et al. |
| 2004/0185868 A1 | 9/2004 | Jain et al. |
| 2004/0186921 A1 | 9/2004 | Wolrich et al. |
| 2004/0190906 A1 | 9/2004 | Jain |
| 2004/0199887 A1 | 10/2004 | Jain et al. |
| 2004/0203795 A1 | 10/2004 | Brusilovsky et al. |
| 2004/0203991 A1 | 10/2004 | Chen et al. |
| 2004/0205316 A1 | 10/2004 | Hooper et al. |
| 2004/0205569 A1 | 10/2004 | McCarty et al. |
| 2004/0224666 A1 | 11/2004 | Jain et al. |
| 2004/0224667 A1 | 11/2004 | Jain |
| 2004/0225907 A1 | 11/2004 | Jain et al. |
| 2004/0230680 A1 | 11/2004 | Jain et al. |
| 2004/0252686 A1 | 12/2004 | Hooper et al. |
| 2004/0252711 A1 | 12/2004 | Romano et al. |
| 2005/0010761 A1 | 1/2005 | Remedios et al. |
| 2005/0018601 A1 | 1/2005 | Kalkunte et al. |
| 2005/0086416 A1* | 4/2005 | Utley .......................... 711/5 |

OTHER PUBLICATIONS

"Intel IXP2400 Network Processor—For OC-48/2.5 Gbps network access and edge applications", *Product Brief*, (2002),1-6.

"Intel IXP2850 Network Processor—High-speed, secure content processing in a single chip", *Product Brief*, (2002),1-6.

* cited by examiner

METHOD AND APPARATUS PROVIDING EFFICIENT QUEUE DESCRIPTOR MEMORY ACCESS

CROSS REFERENCE TO RELATED APPLICATIONS

Not Applicable.

STATEMENT REGARDING FEDERALLY SPONSORED RESEARCH

Not Applicable.

BACKGROUND

As is known in the art, DRAM (Dynamic Random Access Memory) is significantly denser, e.g., more memory cells per unit area, than SRAM (Static Random Access Memory). Thus, using DRAM provides larger capacity per chip than SRAM implementations. DRAM is also significantly less expensive than SRAM at present. However, SRAM may be required when low latency access and/or deterministic access (no bank conflicts) are needed to meet system requirements. In real time applications having limited memory access time budgets, DRAM may not be an option due to successive accesses going to the same memory bank so as to increase the per reference access latency to unacceptable levels. Thus, designers typically prefer to use DRAM but select SRAM when DRAM does not meet one or more performance requirements, such as latency.

As is also known in the art, network processor units (NPUs) can use control structures to implement data queues and the like. Typical applications use DRAM to store data buffers of packets and SRAM for queue control data structures. SRAM is typically selected for queue control data structures due to potential DRAM bank conflicts and concomitant latency penalties since the queuing of packets or cells results in repeated references to queue descriptors and buffer descriptors stored in the same memory bank. U.S. Patent Application Publication No. 2003/0140196 A1, for example, describes an exemplary queue control implementation. The NPU holds the most recently used queue descriptors in an on chip cache. For enqueue and dequeue operations, when a queue descriptor is needed that is not contained in the cache, the least recently used (LRU) entry of the cache is evicted, and is replaced by fetching the needed queue descriptor from SRAM. However, the use of SRAM increases the overall cost and required real estate for the NPU.

BRIEF DESCRIPTION OF THE DRAWINGS

The exemplary embodiments contained herein will be more fully understood from the following detailed description taken in conjunction with the accompanying drawings, in which.

DETAILED DESCRIPTION

Figure 1:
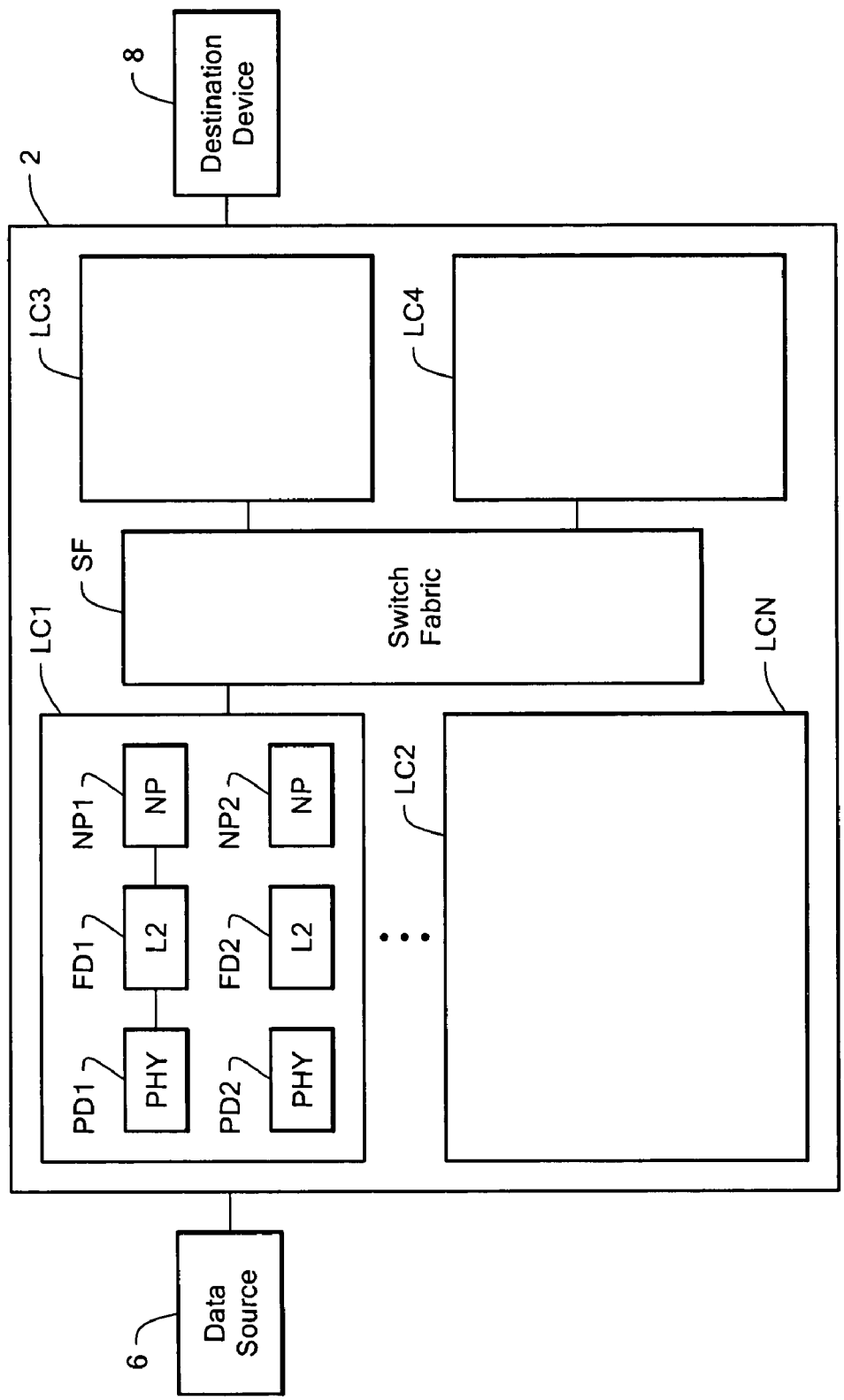
FIG. 1 is a diagram of an exemplary system including a network device having a network processor unit with a mechanism to avoid memory back conflicts when accessing queue descriptors.

FIG. 1 shows an exemplary network device 2 having a network processor units (NPUs) utilizing queue control structures to manage queues when processing incoming packets from a data source 6 and transmitting the processed data to a destination device 8. The network device 2 can include, for example, a router, a switch, and the like. The data source 6 and destination device 8 can include various network devices now known, or yet to be developed, that can be connected over a communication path, such as an optical path having a OC-192 line speed.

The illustrated network device 2 can manage queues as described in detail below. The device 2 features a collection of line cards LC1-LC4 ("blades") interconnected by a switch fabric SF (e.g., a crossbar or shared memory switch fabric). The switch fabric SF, for example, may conform to CSIX or other fabric technologies such as HyperTransport, Infiniband, PCI, Packet-Over-SONET, RapidIO, and/or UTOPIA (Universal Test and Operations PHY Interface for ATM).

Individual line cards (e.g., LC1) may include one or more physical layer (PHY) devices PD1, PD2 (e.g., optic, wire, and wireless PHYs) that handle communication over network connections. The PHYs PD translate between the physical signals carried by different network mediums and the bits (e.g., "0"-s and "1"-s) used by digital systems. The line cards LC may also include framer devices (e.g., Ethernet, Synchronous Optic Network (SONET), High-Level Data Link (HDLC) framers or other "layer 2" devices) FD1, FD2 that can perform operations on frames such as error detection and/or correction. The line cards LC shown may also include one or more network processors NP1, NP2 that perform packet processing operations for packets received via the PHY(s) and direct the packets, via the switch fabric SF, to a line card LC providing an egress interface to forward the packet. Potentially, the network processor(s) NP may perform "layer 2" duties instead of the framer devices FD.

Figure 2:
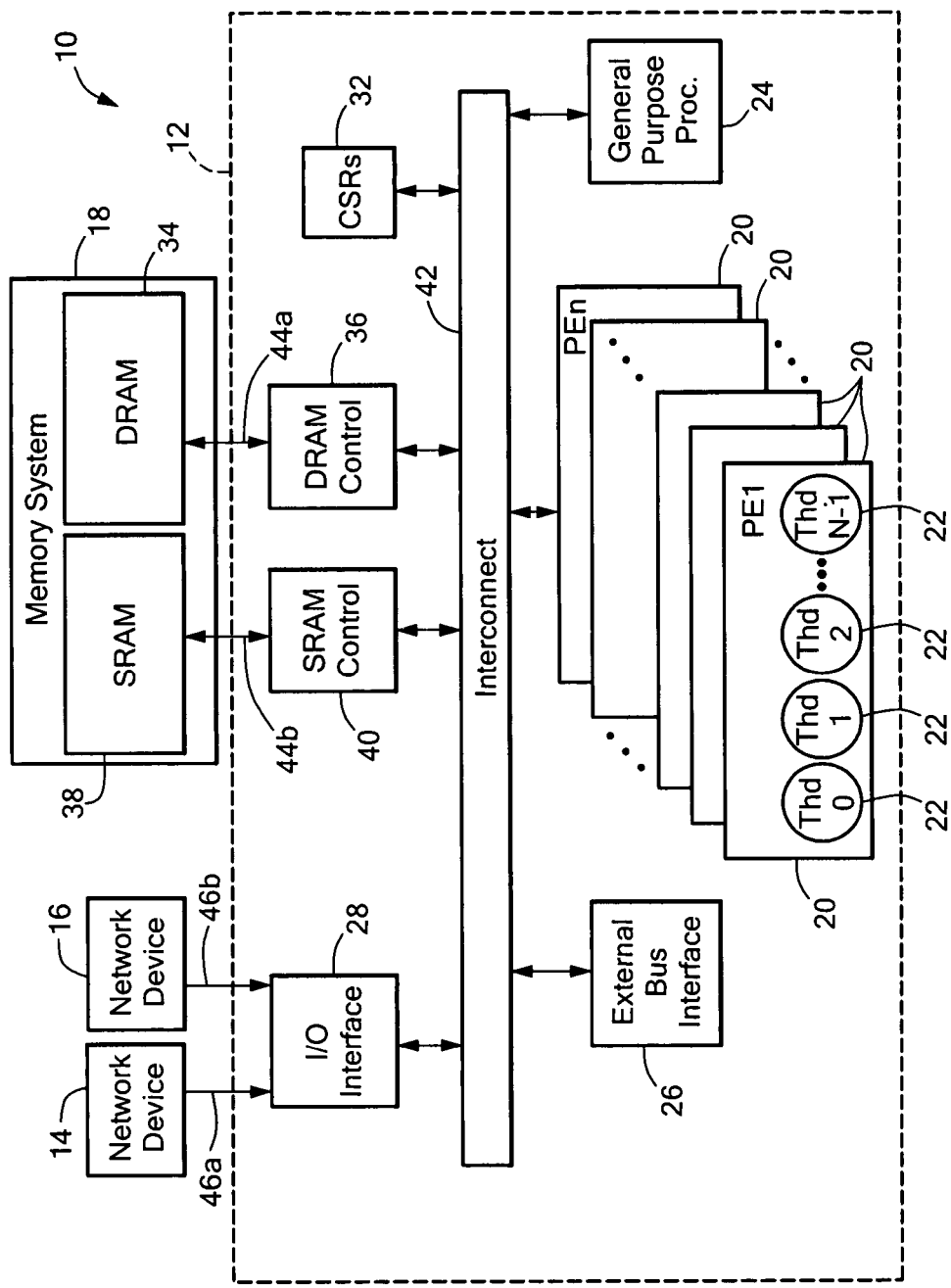
FIG. 2 is a diagram of an exemplary network processor having processing elements with a conflict-avoiding queue descriptor structure.

FIG. 2 shows an exemplary system 10 including a processor 12, which can be provided as a network processor. The processor 12 is coupled to one or more I/O devices, for example, network devices 14 and 16, as well as a memory system 18. The processor 12 includes multiple processors ("processing engines" or "PEs") 20, each with multiple hardware controlled execution threads 22. In the example shown, there are "n" processing elements 20, and each of the processing elements 20 is capable of processing multiple threads 22, as will be described more fully below. In the described embodiment, the maximum number "N" of threads supported by the hardware is eight. Each of the processing elements 20 is connected to and can communicate with adjacent processing elements.

In one embodiment, the processor 12 also includes a general-purpose processor 24 that assists in loading microcode control for the processing elements 20 and other resources of the processor 12, and performs other computer type functions such as handling protocols and exceptions. In network processing applications, the processor 24 can also provide support for higher layer network processing tasks that cannot be handled by the processing elements 20.

The processing elements 20 each operate with shared resources including, for example, the memory system 18, an external bus interface 26, an I/O interface 28 and Control and Status Registers (CSRs) 32. The I/O interface 28 is responsible for controlling and interfacing the processor 12 to the I/O devices 14, 16. The memory system 18 includes a Dynamic Random Access Memory (DRAM) 34, which is accessed using a DRAM controller 36 and a Static Random Access Memory (SRAM) 38, which is accessed using an SRAM controller 40. Although not shown, the processor 12 also would include a nonvolatile memory to support boot operations. The DRAM 34 and DRAM controller 36 are typically used for processing large volumes of data, e.g., in network applications, processing of payloads from network packets. In a networking implementation, the SRAM 38 and SRAM controller 40 are used for low latency, fast access tasks, e.g., accessing look-up tables, and so forth.

The devices 14, 16 can be any network devices capable of transmitting and/or receiving network traffic data, such as framing/MAC devices, e.g., for connecting to 10/100BaseT Ethernet, Gigabit Ethernet, ATM or other types of networks, or devices for connecting to a switch fabric. For example, in one arrangement, the network device 14 could be an Ethernet MAC device (connected to an Ethernet network, not shown) that transmits data to the processor 12 and device 16 could be a switch fabric device that receives processed data from processor 12 for transmission onto a switch fabric.

In addition, each network device 14, 16 can include a plurality of ports to be serviced by the processor 12. The I/O interface 28 therefore supports one or more types of interfaces, such as an interface for packet and cell transfer between a PHY device and a higher protocol layer (e.g., link layer), or an interface between a traffic manager and a switch fabric for Asynchronous Transfer Mode (ATM), Internet Protocol (IP), Ethernet, and similar data communications applications. The I/O interface 28 may include separate receive and transmit blocks, and each may be separately configurable for a particular interface supported by the processor 12.

Other devices, such as a host computer and/or bus peripherals (not shown), which may be coupled to an external bus controlled by the external bus interface 26 can also be serviced by the processor 12.

In general, as a network processor, the processor 12 can interface to various types of communication devices or interfaces that receive/send data. The processor 12 functioning as a network processor could receive units of information from a network device like network device 14 and process those units in a parallel manner. The unit of information could include an entire network packet (e.g., Ethernet packet) or a portion of such a packet, e.g., a cell such as a Common Switch Interface (or "CSIX") cell or ATM cell, or packet segment. Other units are contemplated as well.

Each of the functional units of the processor 12 is coupled to an internal bus structure or interconnect 42. Memory busses 44a, 44b couple the memory controllers 36 and 40, respectively, to respective memory units DRAM 34 and SRAM 38 of the memory system 18. The I/O Interface 28 is coupled to the devices 14 and 16 via separate I/O bus lines 46a and 46b, respectively.

Figure 3:
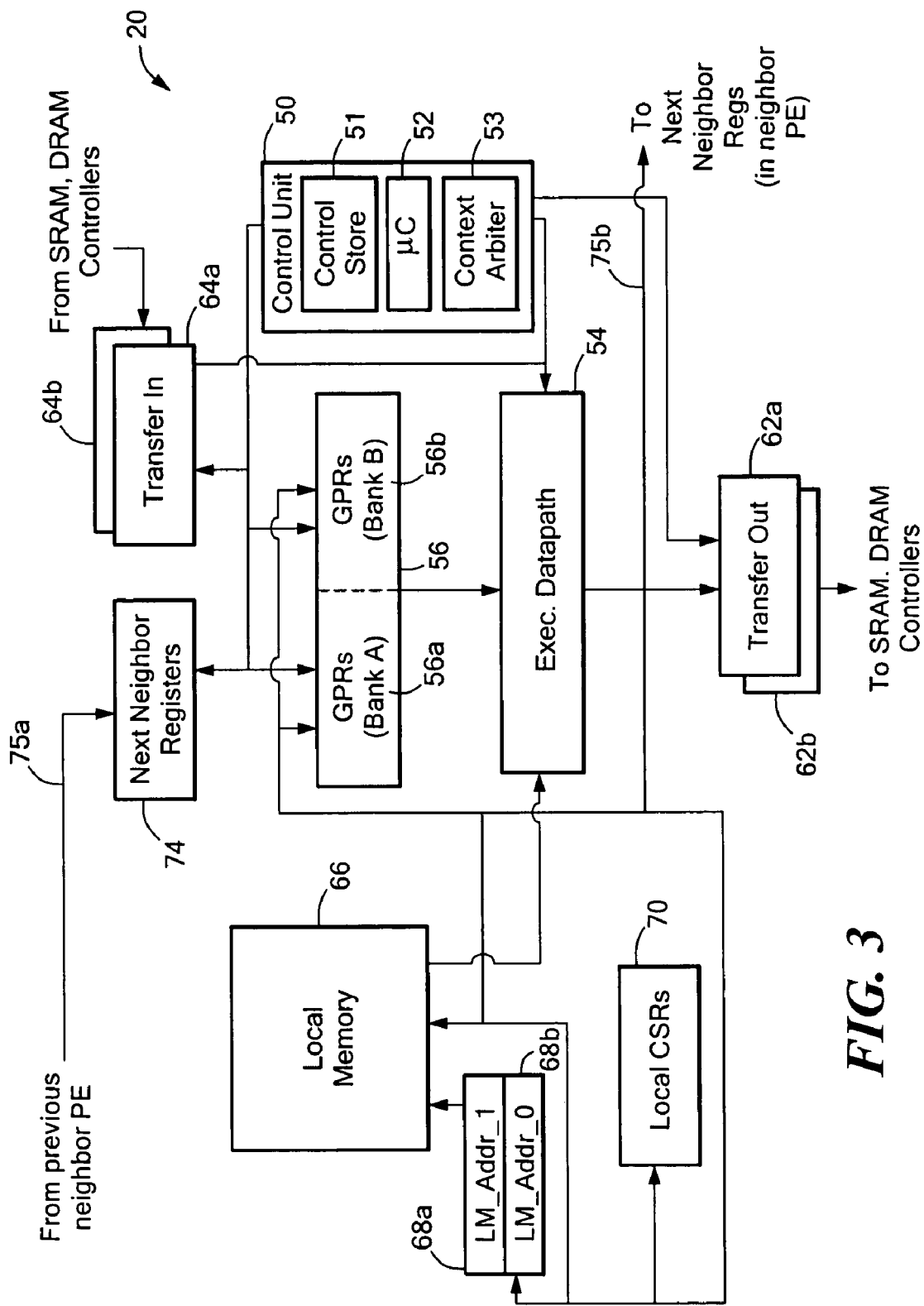
FIG. 3 is a diagram of an exemplary processing element (PE) that runs microcode.

Referring to FIG. 3, an exemplary one of the processing elements 20 is shown. The processing element (PE) 20 includes a control unit 50 that includes a control store 51, control logic (or microcontroller) 52 and a context arbiter/event logic 53. The control store 51 is used to store microcode. The microcode is loadable by the processor 24. The functionality of the PE threads 22 is therefore determined by the microcode loaded via the core processor 24 for a particular user's application into the processing element's control store 51.

The microcontroller 52 includes an instruction decoder and program counter (PC) unit for each of the supported threads. The context arbiter/event logic 53 can receive messages from any of the shared resources, e.g., SRAM 38, DRAM 34, or processor core 24, and so forth. These messages provide information on whether a requested function has been completed.

The PE 20 also includes an execution datapath 54 and a general purpose register (GPR) file unit 56 that is coupled to the control unit 50. The datapath 54 may include a number of different datapath elements, e.g., an ALU, a multiplier and a Content Addressable Memory (CAM).

The registers of the GPR file unit 56 (GPRs) are provided in two separate banks, bank A 56a and bank B 56b. The GPRs are read and written exclusively under program control. The GPRs, when used as a source in an instruction, supply operands to the datapath 54. When used as a destination in an instruction, they are written with the result of the datapath 54. The instruction specifies the register number of the specific GPRs that are selected for a source or destination. Opcode bits in the instruction provided by the control unit 50 select which datapath element is to perform the operation defined by the instruction.

The PE 20 further includes a write transfer (transfer out) register file 62 and a read transfer (transfer in) register file 64. The write transfer registers of the write transfer register file 62 store data to be written to a resource external to the processing element. In the illustrated embodiment, the write transfer register file is partitioned into separate register files for SRAM (SRAM write transfer registers 62a) and DRAM (DRAM write transfer registers 62b). The read transfer register file 64 is used for storing return data from a resource external to the processing element 20. Like the write transfer register file, the read transfer register file is divided into separate register files for SRAM and DRAM, register files 64a and 64b, respectively. The transfer register files 62, 64 are connected to the datapath 54, as well as the control store 50. It should be noted that the architecture of the processor 12 supports "reflector" instructions that allow any PE to access the transfer registers of any other PE.

Also included in the PE 20 is a local memory 66. The local memory 66 is addressed by registers 68a ("LM_Addr_1"), 68b ("LM_Addr_0"), which supplies operands to the datapath 54, and receives results from the datapath 54 as a destination.

The PE 20 also includes local control and status registers (CSRS) 70, coupled to the transfer registers, for storing local inter-thread and global event signaling information, as well as other control and status information. Other storage and functions units, for example, a Cyclic Redundancy Check (CRC) unit (not shown), may be included in the processing element as well.

Other register types of the PE 20 include next neighbor (NN) registers 74, coupled to the control store 50 and the execution datapath 54, for storing information received from a previous neighbor PE ("upstream PE") in pipeline processing over a next neighbor input signal 76a, or from the same PE, as controlled by information in the local CSRs 70. A next neighbor output signal 76b to a next neighbor PE ("downstream PE") in a processing pipeline can be provided under the control of the local CSRs 70. Thus, a thread on any PE can signal a thread on the next PE via the next neighbor signaling.

While illustrative target hardware is shown and described herein in some detail, it is understood that the exemplary embodiments shown and described herein for efficient memory access for queue control structures they are applicable to a variety of hardware, processors, architectures, devices, development systems/tools and the like.

Figure 4:
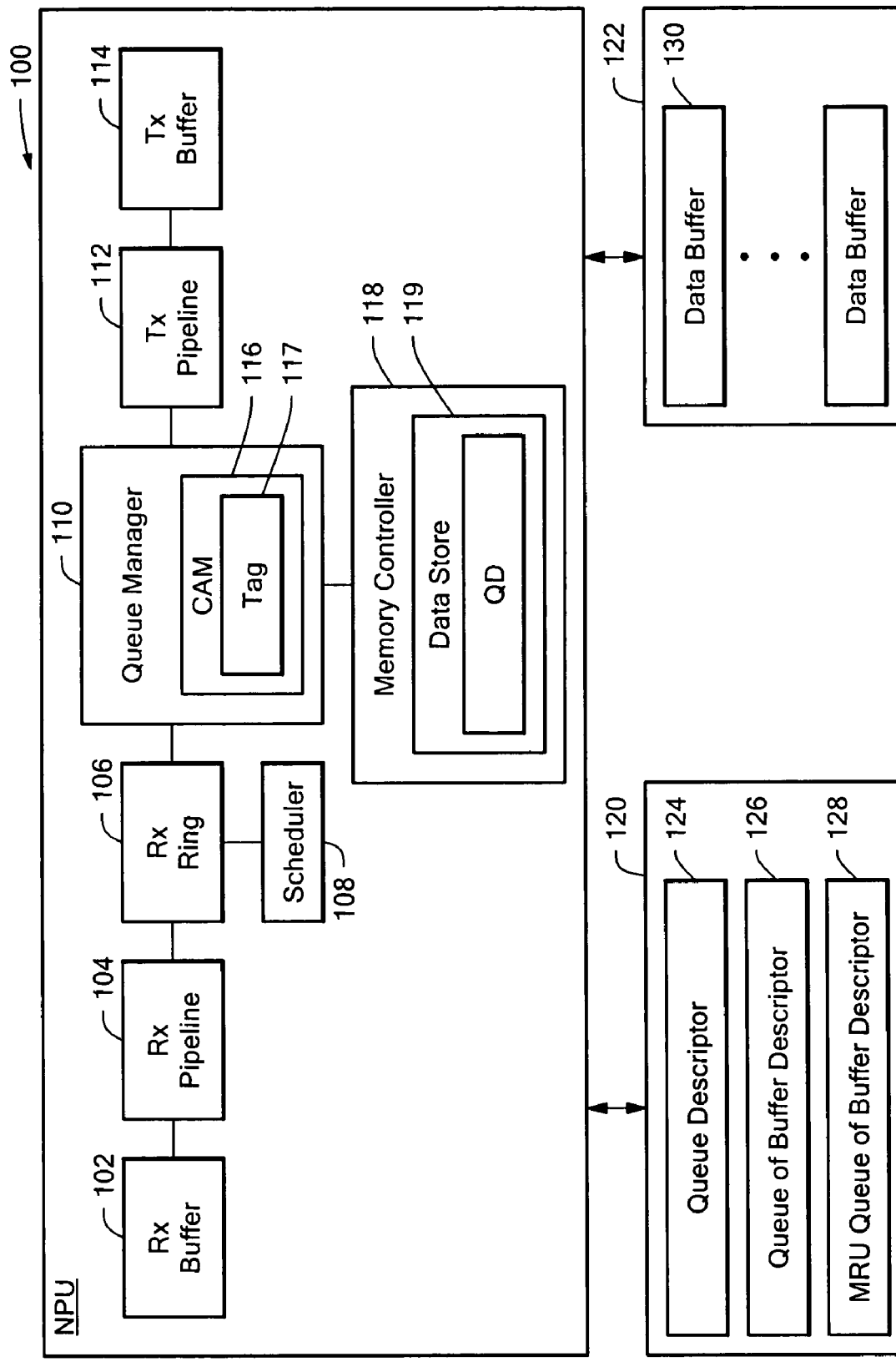
FIG. 4 is a diagram showing an exemplary queuing arrangement.

FIG. 4 shows an exemplary NPU 100 receiving incoming data and transmitting the processed data using queue data control structures. As described above, processing elements in the NPU 100 can perform various functions. In the illustrated embodiment, the NPU 100 includes a receive buffer 102 providing data to a receive pipeline 104 that sends data to a receive ring 106, which may have a first-in-first-out (FIFO) data structure, under the control of a scheduler 108. A queue manager 110 receives data from the ring 106 and ultimately provides queued data to a transmit pipeline 112 and transmit buffer 114. The queue manager 110 includes a content addressable memory (CAM) 116 having a tag area to maintain a list 117 of tags each of which points to a corresponding entry in a data store portion 119 of a memory controller 118. In one embodiment, each processing element includes a CAM to cache a predetermined number, e.g., sixteen, of the most recently used (MRU) queue descriptors. The memory controller 118 communicates with the first and second memories 120, 122 to process queue commands and exchange data with the queue manager 110. The data store portion 119 contains cached queue descriptors, to which the CAM tags 117 point.

The first memory 120 can store queue descriptors 124, a queue of buffer descriptors 126, and a list of MRU (Most Recently Used) queue of buffer descriptors 128 and the second memory 122 can store processed data in data buffers 130, as described more fully below.

While first and second memories 102, 122 are shown, it is understood that a single memory can be used to perform the functions of the first and second memories. In addition, while the first and second memories are shown being external to the NPU, in other embodiments the first memory and/or the second memory can be internal to the NPU.

The receive buffer 102 buffers data packets each of which can contain payload data and overhead data, which can include the network address of the data source and the network address of the data destination. The receive pipeline 104 processes the data packets from the receive buffer 102 and stores the data packets in data buffers 130 in the second memory 122. The receive pipeline 104 sends requests to the queue manager 110 through the receive ring 106 to append a buffer to the end of a queue after processing the packets. Exemplary processing includes receiving, classifying, and storing packets on an output queue based on the classification.

An enqueue request represents a request to add a buffer descriptor that describes a newly received buffer to the queue of buffer descriptors 126 in the first memory 120. The receive pipeline 104 can buffer several packets before generating an enqueue request.

The scheduler 108 generates dequeue requests when, for example, the number of buffers in a particular queue of buffers reaches a predetermined level. A dequeue request represents a request to remove the first buffer descriptor. The scheduler 108 also may include scheduling algorithms for generating dequeue requests such as "round robin", priority-based, or other scheduling algorithms. The queue manager 110, which can be implemented in one or more processing elements, processes enqueue requests from the receive pipeline 104 and dequeue requests from the scheduler 108.

Figure 5:
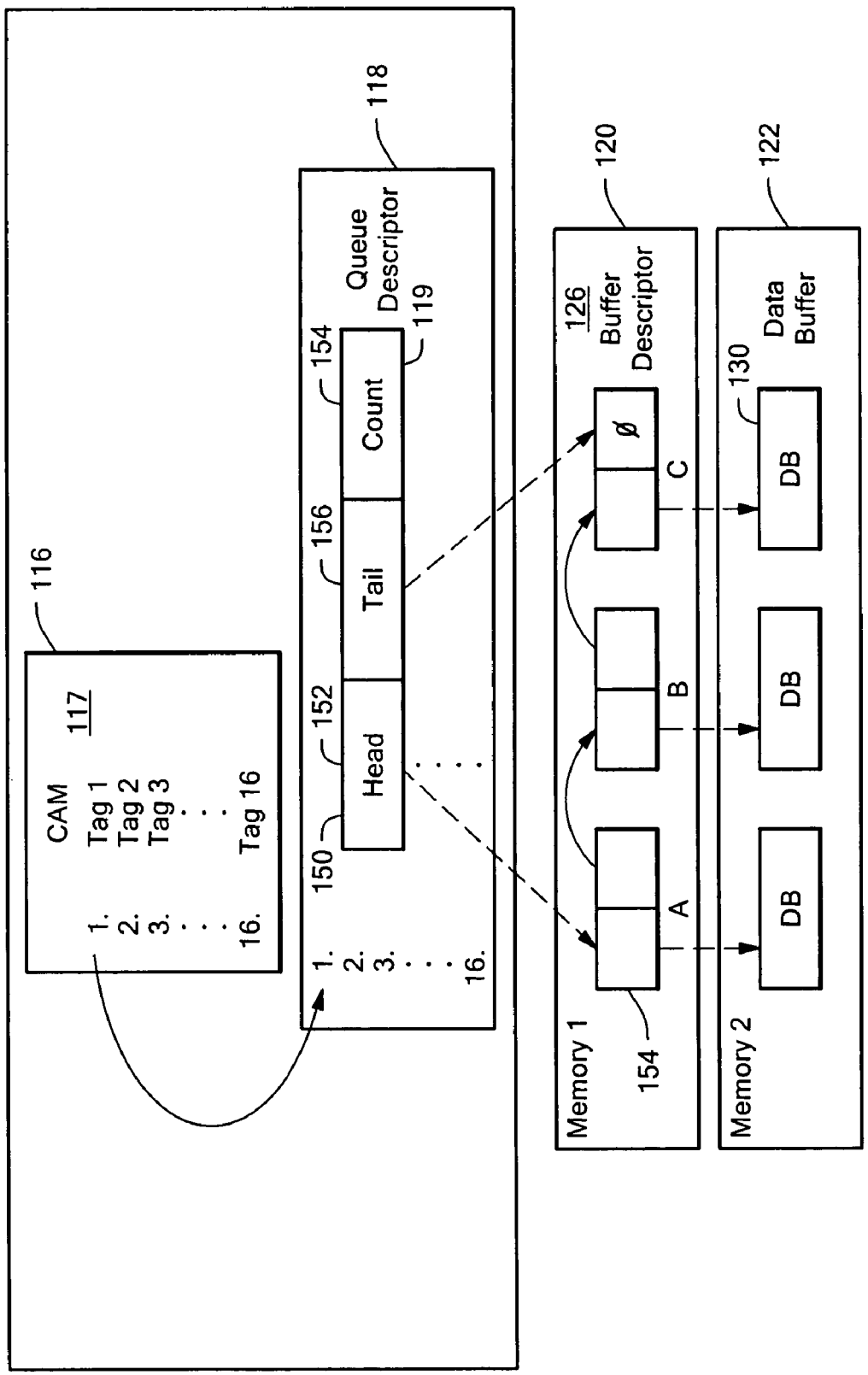
FIG. 5 is a diagram showing queue control structures.

FIG. 5, in combination with FIG. 4, shows exemplary data structures that describe the queues using queue descriptors managed by a queue manager. In one embodiment, the memory controller 118 includes a cached queue descriptor 150 having a head pointer 152 that points to the first entry 154 of a queue A, a tail pointer 156 that points to the last entry C of a queue, and a count field 154 which indicates the number of entries currently on the queue.

The tags 117 are managed by the CAM 116, which can include a least recently used (LRU) cache entry replacement policy. The tags 117 reference a corresponding one of the last N queue descriptors in the memory controller 118 used to perform an enqueue or dequeue operation, where N is the number of entries in the CAM. The queue descriptor location in memory is stored as a CAM entry. The actual data placed on the queue is stored in the second memory 122 in the data buffers 130 and is referenced by the queues of buffer descriptors 126 located in the first memory 120.

For single-buffer packets, an enqueue request references a tail pointer 156 and a dequeue request references a head pointer 152. The memory controller 118 maintains a predetermined number, e.g., sixteen, of the most recently used (MRU) queue descriptors 150. Each cached queue descriptor includes pointers to the corresponding MRU queue of buffer descriptors 128 in the first memory 120.

There is a mapping between the memory address of each buffer descriptor 126 (e.g., A, B, C) and the memory address of the buffer 130. The buffer descriptor can include an address field (pointing to a data buffer), a cell count field, and an end of packet (EOP) bit. Because each data buffer may be further divided into cells, the cell count field includes information about a cell count of the buffer. In one embodiment, the first buffer descriptor added to a queue will be the first buffer descriptor removed from the queue. For example, each buffer descriptor A, B in a queue, except the last buffer descriptor in the queue, includes a buffer descriptor pointer to the next buffer descriptor in the queue in a linked list arrangement. The buffer descriptor pointer of the last buffer descriptor C in the queue can be null.

The uncached queue descriptors 124 in the first memory 120 are not referenced by the memory controller. Each uncached queue descriptor 124 can be assigned a unique identifier and can include pointers to a corresponding uncached queue of buffer descriptors 126. And each uncached queue of buffer descriptors 126 can includes pointers to the corresponding data buffers 130 in the second memory 122.

Each enqueue request can include an address of the data buffer 130 associated with the corresponding data packet. In addition, each enqueue or dequeue request can include an identifier specifying either an uncached queue descriptor 124 or a MRU queue descriptor in the memory controller 118 associated with the data buffer 130.

In accordance with exemplary embodiments described herein, a queue control system includes a mechanism to avoid memory bank conflicts when accessing queue descriptors. In general, queue descriptors are located between DRAM banks to avoid potential conflicts due to the eviction of a cached LRU queue descriptor to memory and the fetch of a new queue descriptor from memory to cache. With this arrangement, DRAM can be used for queue descriptor storage instead of SRAM.

While exemplary queue control structures are described herein, it is understood that the memory bank conflict avoidance mechanism described herein is applicable to a variety of alternative queue control structures.

Figure 6:
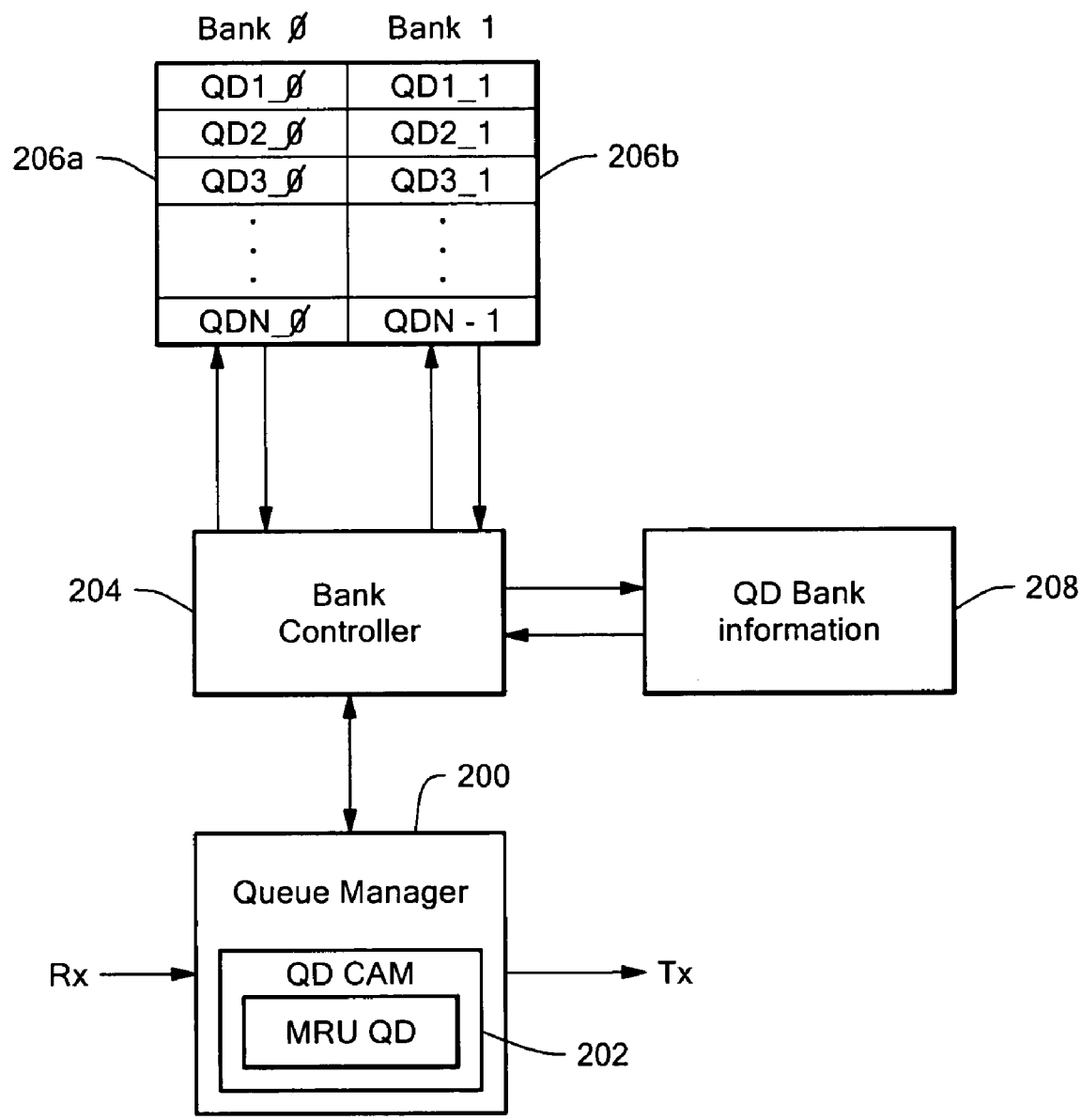
FIG. 6 is a diagram showing a memory conflict avoidance mechanism.

FIG. 6 shows an exemplary mechanism to avoid bank conflicts for queue descriptor accesses. A queue manager 200 including a queue descriptor CAM 202 is coupled to a bank sort controller 204 that controls queue descriptor accesses to first and second banks 206a, 206b of DRAM based upon information stored in a queue descriptor bank info module 208. The information contained in the bank info module 208, which can be considered a database, is used to select one of the banks 206a,b to avoid conflicts during CAM evictions and fetches, as described more fully below.

Figure 7:
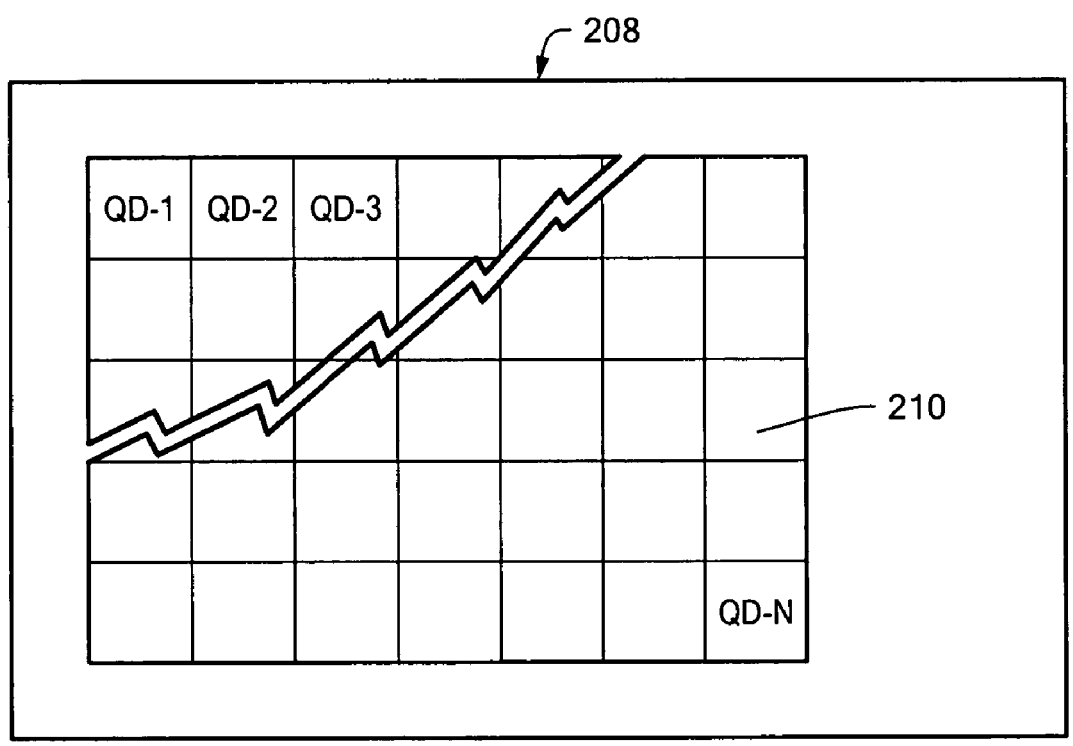
FIG. 7 is a diagram of a queue descriptor bank table.

In one particular embodiment shown in FIG. 7, the queue descriptor bank info module 208 includes a table 210 having one-bit per queue descriptor. Now referring to FIG. 6 in combination with FIG. 7, the bank table 210 can reside in the NPU or be external to the NPU. As packets are received and added to the various queues, the queue manager 200 examines the CAM 202 to determine whether the queue descriptor for the applicable queue is presently cached. If the queue descriptor is not one of the sixteen, for example, most recently used (MRU) queue descriptors, the particular queue descriptor for the applicable queue is fetched from one of the memory banks 206a,b and placed in the CAM. The least recently used (LRU) entry in the CAM is evicted and stored in one of the memory banks 206a,b based upon information in the bank table 208.

When a queue descriptor is to be fetched from memory, the bank table 210 is referenced by the bank controller 204 to determine which one of the first and second banks 206a,b presently contains that queue descriptor. The evicted queue descriptor is written to a different bank than the one from which the queue descriptor is fetched. The bank table 210 is updated to indicate the bank in which the victim queue descriptor is stored. While this arrangement requires locations to be reserved in both memory banks for each queue descriptor, the benefits afforded by the use of DRAM instead of SRAM to store the queue descriptors include less overall real estate required and less overall cost.

This ensures that two block reads and two block writes for an enqueue and (dequeue) per packet time produce two accesses to at least two different banks. For example, at an OC-192 line rate (10 Gbps) the packet arrival time for minimum packets is 40 ns. With $t_{RC}$=20 ns for RLDRAM (Reduced Latency DRAM), sufficient bandwidth for queue descriptor access is assured, where $t_{RC}$ defines the minimum time from the start of one row access to the start of the next (memory cycle time).

Figure 8:
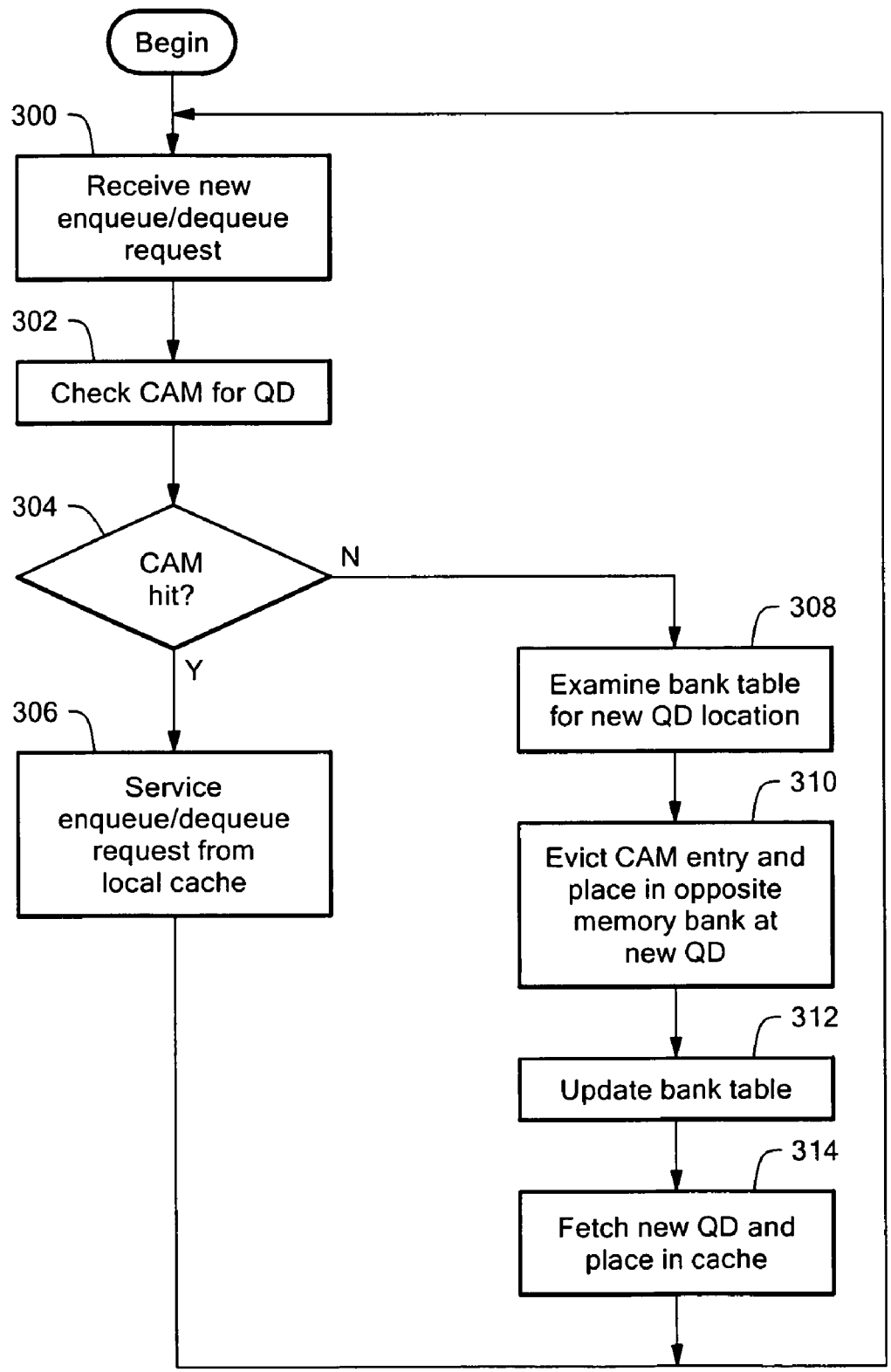
FIG. 8 is a flow diagram showing exemplary processing blocks to implement queuing control structures having memory conflict avoidance.

FIG. 8 shows an exemplary sequence of processing blocks to implement queue descriptor conflict avoidance. In processing block 300, a new enqueue/dequeue request arrives. In processing block 302, the CAM is examined to determine if the queue descriptor for the applicable queue is present in the CAM. It is determined in decision processing block 304 whether there is a CAM hit. If so, the enqueue/dequeue request is serviced from local cache in processing block 306 and processing continues in block 300.

If the queue descriptor was not found in the CAM as determined in block 304, the queue descriptor bank table is accessed in block 308 to determine the memory bank in which the queue descriptor to be fetched is located. In processing block 310, the LRU CAM entry is evicted from cache and placed in a different memory bank from which the new queue descriptor is to be fetched and the bank table is updated to identify the bank of this queue descriptor in processing block 312. The queue descriptor to be cached is then fetched and placed in the cache in processing block 314.

It is understood that this arrangement is readily extendible to additional memory banks. For example, if more accesses to a data structure need to be guaranteed the table can be expanded to two bits per queue descriptor, for example, placing the current queue descriptor in one of four banks. After determining the bank location of both an enqueue and dequeue request, the alternate banks are assigned to the evicted queue descriptors. If the enqueue and dequeue queue descriptors are not in the same banks, there are two reads to different banks, and two evicts to the remaining two banks. Where both new descriptors must be fetched from the same bank three out four memory banks are used.

While illustrative queue control structure are shown and described in conjunction with specific examples of a network processor and a device incorporating network processors, it is understood that the techniques may be implemented in a variety of architectures including network processors and network devices having designs other than those shown. Additionally, the techniques may be used in a wide variety of network devices (e.g., a router, switch, bridge, hub, traffic generator, and so forth). It is further understood that the term circuitry as used herein includes hardwired circuitry, digital circuitry, analog circuitry, programmable circuitry, and so forth. The programmable circuitry may operate on computer programs.

Other embodiments are within the scope of the following claims.

The invention claimed is:

1. A method of managing a queue, comprising:
   receiving a request to place data in a queue;
   examining cache memory to determine if a queue descriptor associated with the queue is present in the cache;
   fetching the queue descriptor from a first one of a plurality of memory banks if the queue descriptor was not in the cache;
   evicting a different queue descriptor from the cache and placing the evicted queue descriptor in a second one of the plurality of memory banks that is different from the first one of the memory banks to avoid memory conflicts; and
   updating a bank table to reflect that the evicted queue descriptor is located in the second one of the plurality of memory banks.

2. The method according to claim 1, wherein the plurality of memory banks include DRAM.

3. The method according to claim 1, wherein the bank table forms a part of a network processing unit.

4. The method according to claim 1, further including reserving locations in the first and second ones of the plurality of memory banks for a given queue descriptor.

5. The method according to claim 1, further including examining a content addressable memory (CAM) coupled to the cache memory to determine cache hits.

6. The method according to claim 5, wherein the CAM forms a part of a queue manager.

7. A processor system, comprising:
   a queue manager to receive and transmit data, the queue manager having cache memory;
   a bank controller coupled to the queue manager;
   a plurality of memory banks coupled to the bank controller; and
   a queue descriptor bank info module coupled to the bank controller such that the system is enabled to fetch a queue descriptor from a first one of the plurality of memory banks if the queue descriptor was not in the cache, and evict a different queue descriptor from the cache and place the evicted queue descriptor in a second one of the plurality of memory banks that is different from the first one of the memory banks based upon information in the bank info module to avoid memory conflicts, wherein the queue descriptor bank info module comprises a bank table configured to be updated to reflect that the evicted queue descriptor is located in the second one of the plurality of memory banks.

8. The system according to claim 7, wherein at least two location in different ones of the plurality of memory banks are reserved for a given queue descriptor.

9. The system according to claim 7, wherein the system includes a network processor unit having multiple processing elements.

10. The system according to claim 7, wherein the system forms a part of a network forwarding device.

11. An article, comprising:
a storage medium having stored thereon instructions that when executed by a machine result in the following:
receiving a request to place data in a queue;
examining cache memory to determine if a queue descriptor associated with the queue is present in the cache;
fetching the queue descriptor from a first one of a plurality of memory banks if the queue descriptor was not in the cache;
evicting a different queue descriptor from the cache and placing the evicted queue descriptor in a second one of the plurality of memory banks that is different from the first one of the memory banks to avoid memory conflicts; and
updating a bank table to reflect that the evicted queue descriptor is located in the second one of the plurality of memory banks.

12. The article according to claim 11, further including reserving locations in the first and second ones of the plurality of memory banks for a given queue descriptor.

13. The article according to claim 11, further including examining a content addressable memory (CAM) coupled to the cache memory to determine cache hits.

14. A network forwarding device, comprising:
at least one line card to forward data to ports of a switching fabric, the at least one line card including a network processor comprising:
a queue manager to receive and transmit data, the queue manager having cache memory;
a bank controller coupled to the queue manager;
a plurality of memory banks coupled to the bank controller; and
a queue descriptor bank info module coupled to the bank controller such that the system is enabled to fetch a queue descriptor from a first one of the plurality of memory banks if the queue descriptor was not in the cache, and evict a different queue descriptor from the cache and place the evicted queue descriptor in a second one of the plurality of memory banks that is different from the first one of the memory banks based upon information in the bank info module to avoid memory conflicts, wherein the queue descriptor bank info module comprises a bank table configured to be updated to reflect that the evicted queue descriptor is located in the second one of the plurality of memory banks.

15. The device according to claim 14, wherein the plurality of memory banks are provided as DRAM.

16. The device according to claim 14, wherein at least two location in different ones of the plurality of memory banks are reserved for a given queue descriptor.

* * * * *

UNITED STATES PATENT AND TRADEMARK OFFICE
CERTIFICATE OF CORRECTION

PATENT NO. : 7,277,990 B2  Page 1 of 1
APPLICATION NO. : 10/955969
DATED : October 2, 2007
INVENTOR(S) : Jain et al.

It is certified that error appears in the above-identified patent and that said Letters Patent is hereby corrected as shown below:

On the title page, in field (56), under "U.S. Patent Documents", in column 2, line 6, delete "Thakkar et al." and insert -- Abdallah et al. --, therefor.

On the title page, in field (56), under "Other Publications", in column 2, line 3, delete "Prodcut" and insert -- Product --, therefor.

Signed and Sealed this

Fourth Day of March, 2008

JON W. DUDAS
*Director of the United States Patent and Trademark Office*